United States Patent [19]
Authement

[11] Patent Number: 5,966,861
[45] Date of Patent: Oct. 19, 1999

[54] POLYURETHANE CRAB TRAP FLOAT

[76] Inventor: Donald J. Authement, 6053 Bayouside Dr., Chauvin, La. 70344

[21] Appl. No.: 08/869,422

[22] Filed: Jun. 4, 1997

[51] Int. Cl.$^6$ .................................................... A01K 93/00
[52] U.S. Cl. ............................................ 43/44.91; 43/44.9
[58] Field of Search .............................. 43/44.9, 44.91, 43/44.87, 4.5

[56] References Cited

U.S. PATENT DOCUMENTS

| | | | |
|---|---|---|---|
| 771,263 | 10/1904 | McCord | 43/44.91 |
| 2,315,048 | 3/1943 | Croft | 43/44.9 |
| 2,591,332 | 4/1952 | Behensky | 43/44.91 |
| 2,729,015 | 1/1956 | Finnegan | 43/44.9 |
| 2,763,088 | 9/1956 | Cowsert | 43/44.9 |
| 2,803,917 | 8/1957 | Kimbrough | 43/44.91 |
| 3,337,981 | 8/1967 | Bowman | 43/44.91 |
| 3,404,482 | 10/1968 | Maske | 43/44.9 |
| 3,760,527 | 9/1973 | Hamren | 43/44.91 |
| 3,780,467 | 12/1973 | Lueck | 43/44.9 |
| 4,418,492 | 12/1983 | Rayburn | 43/44.9 |
| 4,458,439 | 7/1984 | Garrett | 43/44.91 |
| 4,845,884 | 7/1989 | Pacitti | 43/44.91 |
| 5,347,745 | 9/1994 | Authement | 43/44.91 |

FOREIGN PATENT DOCUMENTS

| | | | |
|---|---|---|---|
| 11160 | 2/1933 | Australia | 43/44.9 |

Primary Examiner—Kurt Rowan
Attorney, Agent, or Firm—James Creighton Wray; Meera P. Narasimhan

[57] ABSTRACT

An improved float assembly for crab traps includes a polyurethane float with a chemical with-standing surface formed around a first abrasion-resistant float tube and second abrasion-resistant float tube each having a flanged end and a non-flanged end. A collar having an inside diameter necessary for press fit or interference fit on an outside diameter of the float tubes for securing the non-flanged ends of the float tubes together. The collar permits the float tubes to be used in a variety of float sizes. A second embodiment utilizes telescoping float tubes such that the float tubes are secured together without the use of a collar. In preferred embodiments, the flanged ends extend outward perpendicularly to longitudinal axes of the float tubes or extend outward in a generally spheroidally arched manner. The flanged ends provide support to critical areas of the float especially susceptible to wear and tear. A crab trap rope extends through the float tubes and a stop surrounding the rope is secured to the rope and inserted into the top of one of the float tubes for securing the float on the rope for preventing damage to the float by the rope. The polyurethane float is capable of being painted and cleaned and has the advantage of preventing deterioration of the float caused by harsh marine environments.

13 Claims, 3 Drawing Sheets

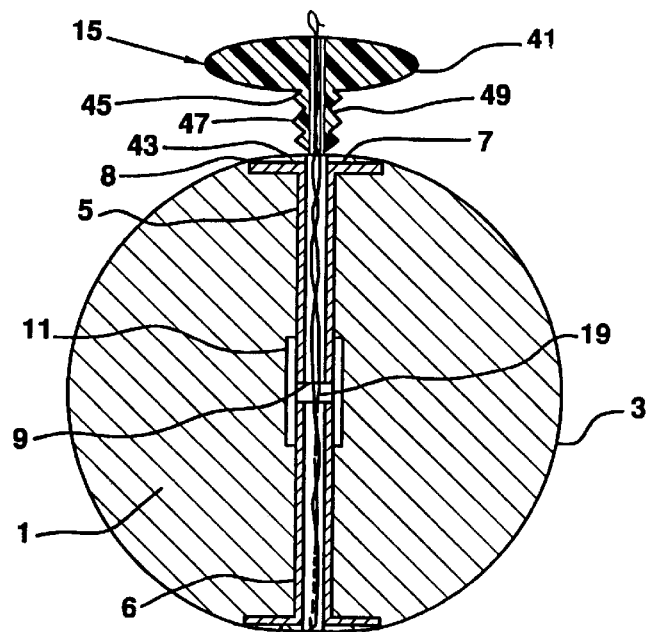
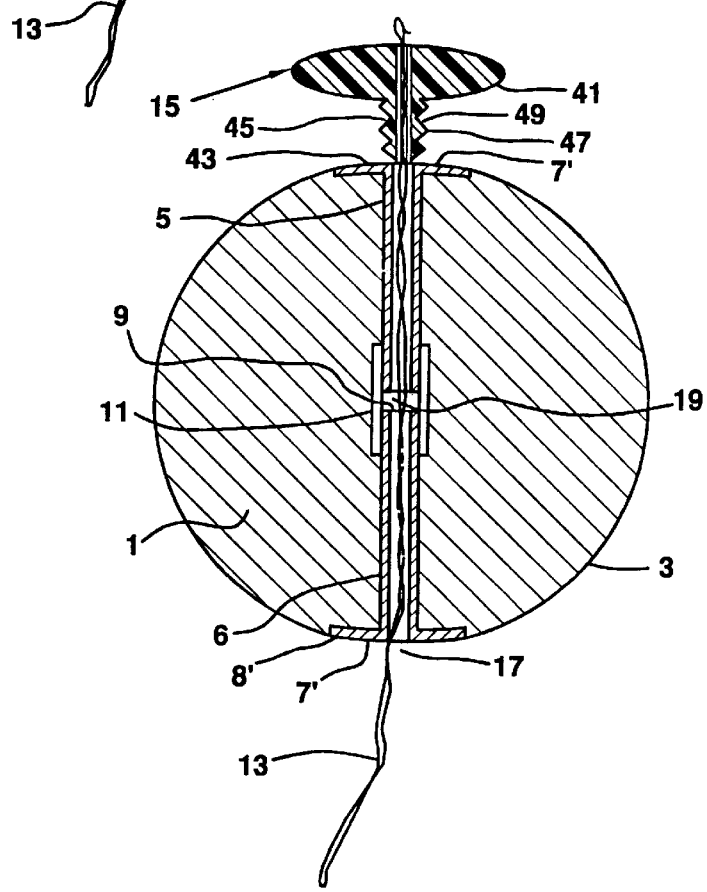

POLYURETHANE CRAB TRAP FLOAT

BACKGROUND OF THE INVENTION

The present invention relates to an improved crab trap float and a method for making the same.

Crab trap floats are traditionally composed of polystyrene. Due to long and continual exposure to the harsh marine environment polystyrene floats are susceptible to degradation. As a result of such degradation, floats are often weakened to the point where they break apart from a crab trap rope. This results in the loss of the attached trap. Furthermore, degradation can occur when a float is exposed to gasoline or solvent while the trap is being serviced. Exposure to gasoline or solvents causes the polystyrene float to quickly deteriorate and shrivel and dissolve.

Another disadvantage of polystyrene is that it cannot be painted with conventional paints because the solvents in the paints cause the polystyrene to deteriorate. Consequently, virtually all traps are white often making it difficult for an owner to visually spot his traps from a distance.

SUMMARY OF THE INVENTION

The objective of this present invention is to remedy the disadvantages of the prior art by providing an improved crab trap float assembly that provides for increased longevity of the float and reduced occurrence of trap loss.

The crab trap float assembly consists of a generally spherical polyurethane float formed around two abrasion-resistant float tubes. The float tubes are preferably flanged on their outer end. The float tubes are positioned in the float such that the non-flanged ends approach each other in a center of the float. A collar is positioned on the non-flanged ends of the float tubes for securing the two float tubes together. The collar is a hollow cylinder with an inside diameter slightly greater than the outside diameter of the float tube. The friction between the collar and the float tubes secures the float tubes together. The collar allows the float tubes to be used in a variety of float sizes. A crab trap rope can then be inserted through the abrasion-resistant tubes and a stop surrounding the rope can be jammed into the top of the float to secure the float on the rope for preventing damage to the float.

In a second embodiment, a telescoping float tube is used. The inner end of the male telescoping float tube has an outer diameter that is similar to the inner diameter of a female telescoping float tube such that the floating tubes are held together by interference or friction fit.

In a preferred embodiment, the outer end flanges extend generally perpendicular to the longitudinal axis of the float tube. In another embodiment, the flanges extend in an arch like manner generally tracing the arc of the spherical float. The flanges provide support to critical areas of the float especially susceptible to wear and tear and rope chafing.

The float is preferably composed of polyurethane. Use of polyurethane allows the float to be painted with conventional relatively inexpensive paints. Painting floats can have two important benefits. First, the paint acts as an adhesive coating to prevent deterioration of the float from exposure to the harsh marine environment. Second, painting the float allows an owner to distinguish his floats in a manner which would allow him to spot his floats at much greater distances.

A polyurethane float, unlike a polystyrene float, can also be cleaned. A substance such as MEK paint thinner can be used to clean the floats in a relatively inexpensive and time efficient manner. Cleaning floats in this manner would provide increased longevity of the float which would reduce the loss of crab traps.

These and further and other objects and features of the invention are apparent in the disclosure, which includes the above and ongoing written specification, with the claims and drawings.

BRIEF DESCRIPTION OF THE DRAWINGS

FIG. 1 is a cross-sectional view of a float assembly having a polyurethane float, float tubes having flanged outer ends extending outward perpendicular to transverse axes of the tubes, and a collar.

FIG. 2 is a cross-sectional view of a float assembly having a polyurethane float, float tubes having flanged outer ends extending outward perpendicular to transverse axes of the tubes, and a collar.

DETAILED DESCRIPTION OF THE DRAWINGS

Figure 3:
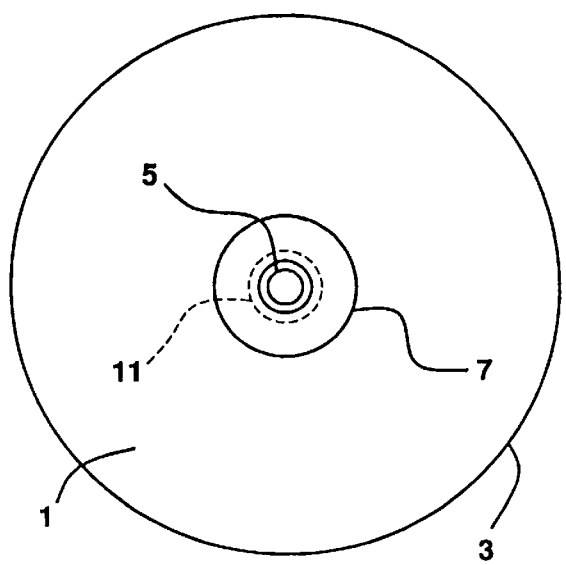
FIG. 3 is an elevation of the float assembly shown in FIG. 1.

As shown in the drawings, a crab trap float assembly includes a generally spherical polyurethane float 1 with a chemical withstanding surface 3 and a centrally elongated rope-receiving opening 4 formed around a first abrasion-resistant float tube 5 and second abrasion-resistant float tube 6. Each float tube 5, 6 has an outer end 7 and an inner end 9. A collar 11 secures the inner ends 9 of the float tubes 5, 6 together. The collar 11 permits the float tubes 5, 6 to be used in a variety of float 1 sizes. A crab trap rope 13 extends through the float tubes 5, 6 and is connected to a crab trap. A stop 15 surrounding the rope 13 and secured to the rope 13 is inserted into the outer end 7 of the first float tube 5 for securing the float 1 on the rope 13 for preventing damage to the float 1 by the rope 13. The stop 15 has an upper end 41 for abutting an upper end 43 of the float tube 5. A depending tubular throat 45 is connected to and extends downward from the enlarged end 41, the tubular throat 45 having plural external, generally radially extending anchors 47 for permitting movement of the stop 15, the throat 45 and the anchors 47 extending from the throat into contact with the float tube 5 for anchoring the throat, anchors and stop in the float 1. A plurality of rope-gripping extensions 49 extend inward from the throat 45 for jamming inward against a rope 13 as the throat 45 and anchors 45 are deformed radially inward upon being compressed in the float tube 5 for preventing movement of the rope 13 through the stop 15.

FIG. 1 shows a preferred embodiment of the crab trap float assembly having float tubes 5, 6. Outer ends 7 of the float tubes 5, 6 have flanges 8 extending radially outward in a manner generally perpendicular to longitudinal axes 17 of the float tubes 5, 6.

FIG. 2 shows a preferred embodiment of the crab trap float assembly having float tubes 5, 6. Outer ends 7' of the float tubes 5, 6 have flanges 8' extending radially outward in a manner generally spheroidally arched inward toward a center 19 of the float 1.

FIG. 3 is an elevation of the float assembly shown in FIG. 1. The polyurethane float 1 with a chemical withstanding surface 3 is formed around a first float tube 5, a flanged outer end 7 of the first float tube 5, and a collar 11.

Figure 4:
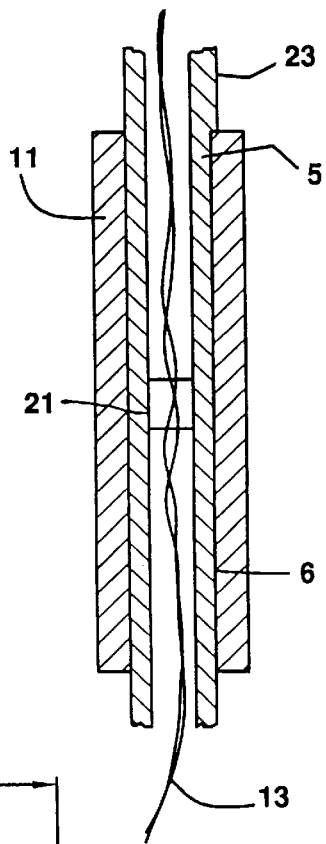
FIG. 4 is a close-up view of the connection between the collar and the float tubes.

FIG. 4 shows a close-up of the collar 11 and the float tubes 5, 6. The collar 11 has an inside diameter 21 necessary for a press fit or interference fit on an outside diameter 23 of the float tubes 5, 6 for securing the inner ends 9 of the float tubes 5, 6 together. The rope 13 runs through the float tubes 5, 6.

Figure 5A:
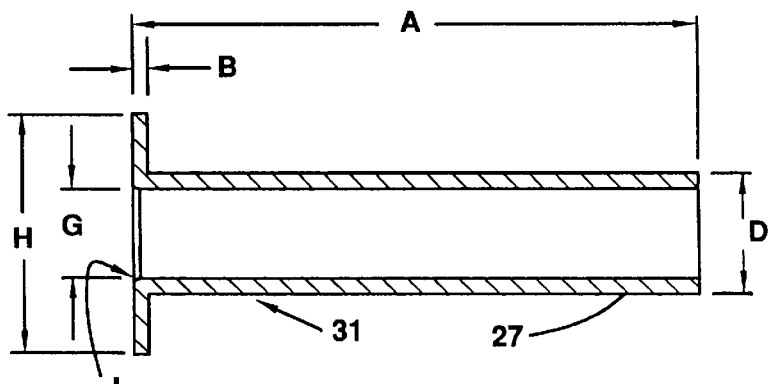
FIG. 5 is a cross-sectional elevation of the first float tube.
Figure 5B:
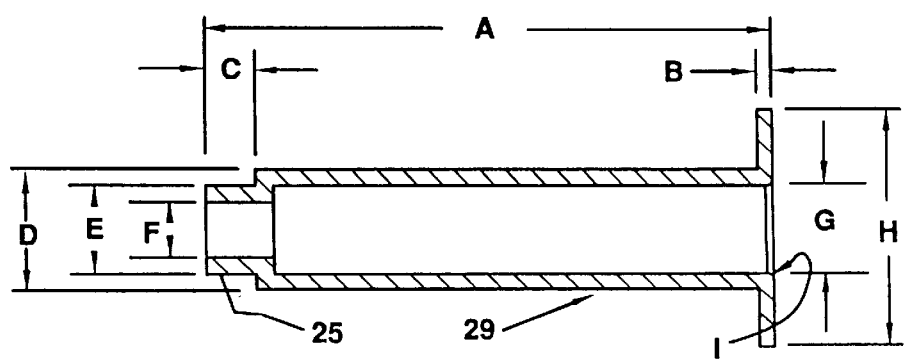

FIG. 5 is a cross-sectional elevation of the first float tube 29. The inner end 25 of the first float tube 29 has an axial extension with a reduced outer diameter for a friction fit inside the second float tube 31.

Figure 6:
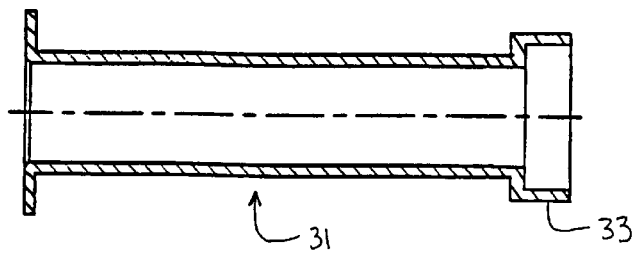
FIG. 6 is a cross-sectional elevation of the second float tube.

FIG. 6 is a cross-sectional elevation of the second float tube 31. The inner end 33 of the second float tube 31 has an axial extension with an enlarged outer diameter for frictionally receiving the inner end extension of the first float tube 25.

Figure 7:
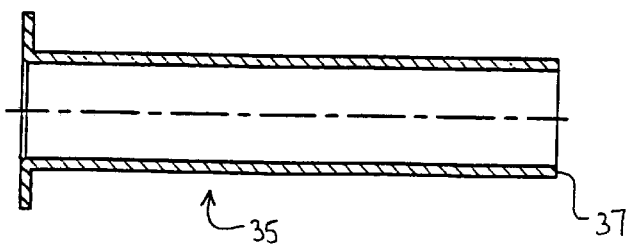
FIG. 7 is a cross-sectional elevation of the second float tube.

FIG. 7 is a cross-sectional elevation of the second float tube 35. The inner end 37 of the second float tube 35 frictionally receives the inner end extension of the first float tube 25.

Figure 8:
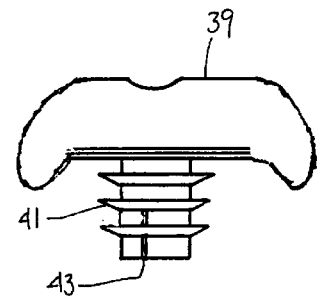
FIG. 8 is a schematic representation of the stop.

FIG. 8 shows the stop with an enlarged upper head end 39 which may be a circular disc or, more preferably, an elliptical body. The anchors 41 are cup-shaped to facilitate insertion of the anchors into the first 29 or second 31 or 35 float tube, but to tighten and spread and resist outward movement of the throat and anchors. Slits 43 allow the throat to compress inwardly in the first 29 or second 31 or 35 float tubes.

While the invention has been described with reference to specific embodiments, modifications and variations of the invention may be construed without departing from the scope of the invention, which is defined in the following claims.

I claim:

1. A crab trap float apparatus comprising a spherical polyurethane float with a chemical withstanding surface and a centrally elongated opening, a first abrasion-resistant float tube and a second abrasion-resistant float tube positioned in the elongated opening, each having a flanged outer end and an inner connecting end, a collar centrally imbedded within the float in the elongated opening having an inside diameter for interference fit on outside diameters of the first and second float tubes for securing the inner ends of the float tubes in the collar, the collar having a length less than a diameter of the float, a crab trap rope extending through the float tubes, and a stop surrounding the rope, secured to the rope and inserted into the flanged end of the first float tube for securing the float on the rope for preventing damage to the float by the rope.

2. The apparatus of claim 1, further comprising the collar centrally imbedded in the elongated opening having an inside diameter for interference fit on outside diameters of the first and second float tubes for securing the inner ends of the float tubes in the collar.

3. The apparatus of claim 1, wherein the stop further comprises an upper end for abutting an upper end of the float tube, a depending tubular throat connected to and extending downward from the upper end, the tubular throat having plural external, radially extending anchors for permitting movement of the stop, the throat and the anchors extending from the throat into contact with the float tube for anchoring the throat, anchors and stop in the float, a plurality of rope-gripping extensions extending inward from the throat for jamming inward against a rope as the throat and anchors are deformed radially inward upon being compressed in the float tube for preventing movement of the rope through the stop.

4. The apparatus of claim 1, wherein the first and second float tubes are made of polypropylene and wherein the first and second float tubes have thicknesses of about 1/16".

5. The apparatus of claim 1, wherein the outer ends of the first and second float tubes extend radially outward in a manner perpendicular to longitudinal axes of the first and second float tubes.

6. The apparatus of claim 1, wherein the outer ends of the first and second float tubes extend radially outward in a manner spheroidally arched around a center of the float.

7. The apparatus of claim 1, wherein the surface of the float is painted for protecting the integrity of the float and for indicating the ownership of the float.

8. A crab trap float apparatus, comprising a polyurethane float having a circular cross-section, a first float tube and second float tube each having a flanged outer end and an inner end, the inner end of the first tube and the second float tube having an inside diameter slightly smaller than an outside diameter of the first and second float tubes forming an abrasion-resistant tube extending through the polyurethane float, a crab trap rope extending through the abrasion-resistant tube, and a stop surrounding and fastened to the rope and inserted into a top of the float for securing the abrasion-resistant tube in the float on the rope to prevent damage to the float by the rope, wherein the first float tube has at its inner end an axial extension with a reduced outer diameter, and wherein the second float tube has at its inner end an axial extension with an enlarged inner diameter for frictionally receiving the inner end of the first float tube, and the axial extension of said first float tube frictionally received in an inner end of said second float tube for securing the inner ends of the float tubes together.

9. The apparatus of claim 8, wherein the stop further comprises an upper end for abutting an upper end of the float tube, a depending tubular throat connected to and extending downward from the upper end, the tubular throat having plural external, radially extending anchors for permitting movement of the stop, the throat and the anchors extending from the throat into contact with the float tube for anchoring the throat, anchors and stop in the float, a plurality of rope-gripping extensions extending inward from the throat for jamming inward against a rope as the throat and anchors are deformed radially inward upon being compressed in the float tube for preventing movement of the rope through the stop.

10. The apparatus of claim 8, wherein the first and second float tubes have flanged outer ends and are made of polypropylene and wherein the first and second float tubes have thicknesses of about 1/16".

11. The apparatus of claim 8, wherein the flanged outer ends of the first and second float tubes extend radially outward in a manner perpendicular to the longitudinal axis of the first and second float tubes.

12. The apparatus of claim 8, wherein the flanged outer ends of the first and second float tubes extend radially outward in a manner spheroidally arched around a center of the float.

13. The apparatus of claim 8, wherein the float is painted for protecting the integrity of the float and for indicating the ownership of the float.

* * * * *